US009377364B2

(12) United States Patent
Pelenc et al.

(10) Patent No.: US 9,377,364 B2
(45) Date of Patent: Jun. 28, 2016

(54) SENSITIVE MATERIAL FOR BOLOMETRIC DETECTION

(71) Applicant: COMMISSARIAT A L'ENERGIE ATOMIQUE ET AUX ENERGIES ALTERNATIVES, Paris (FR)

(72) Inventors: Denis Pelenc, Quaix en Chartreuse (FR); Marie-Francoise Armand, Vaulnaveys-le-Haut (FR); Berangere Hyot, Eybens (FR); Pierre Imperinetti, Seussins (FR); Claire Vialle, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/592,659

(22) Filed: Jan. 8, 2015

(65) Prior Publication Data
US 2015/0192473 A1     Jul. 9, 2015

(30) Foreign Application Priority Data

Jan. 8, 2014    (FR) ...................................... 14 50120

(51) Int. Cl.
*G01J 5/02*     (2006.01)
*G01J 5/20*     (2006.01)
*G01J 5/04*     (2006.01)
*G01J 5/22*     (2006.01)
*G01J 5/24*     (2006.01)
*H01L 31/0256*  (2006.01)

(52) U.S. Cl.
CPC .... *G01J 5/20* (2013.01); *G01J 5/02* (2013.01); *G01J 5/046* (2013.01); *G01J 5/22* (2013.01); *G01J 5/24* (2013.01)

(58) Field of Classification Search
CPC ........... G01J 5/02; G01J 5/20; H01L 31/0256
See application file for complete search history.

(56) References Cited

U.S. PATENT DOCUMENTS

| 3,781,748 | A  | * | 12/1973 | Bishop et al. ................... 338/15 |
| 2002/0134939 | A1 |   | 9/2002 | Giedd et al. ................ 250/338.1 |
| 2012/0132804 | A1 | * | 5/2012 | Lee et al. ...................... 250/330 |

* cited by examiner

*Primary Examiner* — David Porta
*Assistant Examiner* — Faye Boosalis
(74) *Attorney, Agent, or Firm* — Norton Rose Fulbright US LLP

(57) ABSTRACT

The present invention relates to the use, as a thin sensitive-material film for bolometric detection, of at least one material based on an alloy comprising at least one chalcogenide, said chalcogen element being chosen from sulfur, selenium, telluride and their mixtures, characterized in that said material furthermore contains a sufficient amount of carbon and/or boron to confer upon the material a temperature coefficient of resistivity value at 300° C. at least equal to 40% of the native value of the temperature coefficient of resistivity of said material at room temperature. The invention also relates to a bolometric device and its production process.

27 Claims, 1 Drawing Sheet

SENSITIVE MATERIAL FOR BOLOMETRIC DETECTION

Figure 1:
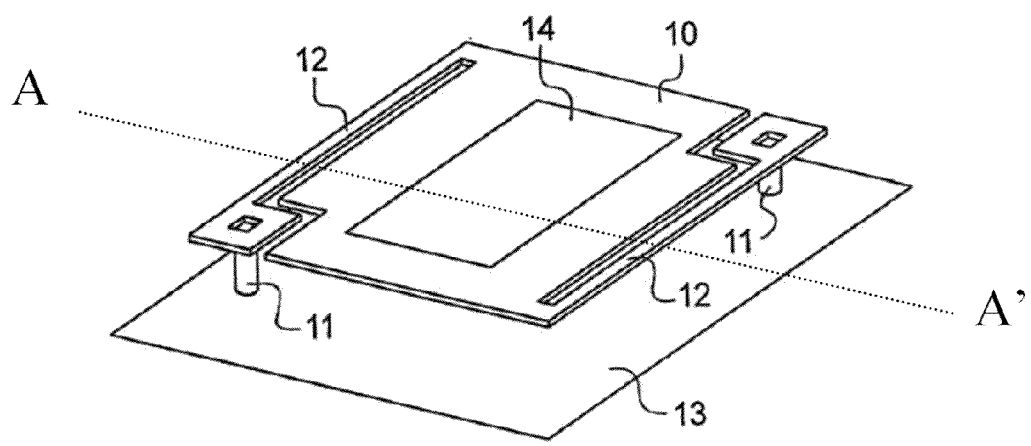

The present invention relates to sensitive materials used for bolometric detection of infrared radiation by matrices of microsensors.

Infrared radiation detectors may be classed into two categories depending on the physical principle that they implement. Quantum detectors and thermal detectors.

The invention more particularly relates to the field of thermal detectors.

These detectors advantageously operate at room temperature. They are capable of absorbing incident infrared radiation and converting it into heat. For this purpose, they generally comprise a sensitive element based on a material the electrical resistance of which varies with temperature. The temperature variation of the sensitive element engenders a variation in the electrical resistivity of said sensitive element. These devices therefore allow, using an appropriate electrical assembly, to convert a modification of the temperature into an electrical signal.

Depending on the property used, the detectors may be of thermoelectric (thermopiles), pyroelectric (pyrometers) or bolometric type, the latter corresponding to the field of the invention As indicated above, bolometric detectors use as sensitive element a material the electrical resistivity of which varies with temperature. This resistivity is characterized by the temperature coefficient of resistivity (TCR) of the material, defined by the formula:

$$TCR = 1/\rho \cdot d\rho/dT$$

where $\rho$ is the resistivity of the material.

An appropriate electrical assembly is used to convert the temperature modification into an electrical signal. Thus, to produce an image in the infrared domain, the sensitive element placed in the focal plane of the video camera is a matrix made up of bolometric pixels, each of them being formed from a suspended membrane that is thermally isolated from its carrier in order to optimize the temperature increase due to the absorption. This membrane generally comprises a material that absorbs the infrared radiation, and the sensitive material.

Production of these matrices of pixels calls upon the thin-film deposition, photolithography and etching techniques employed in the field of micro electromechanical systems (MEMS).

The sensitive materials used to produce matrices of bolometric pixels must therefore be compatible with the constraints imposed by the integration steps. Chalcogenides, materials based on sulfur, selenium or telluride, are especially proposed to constitute this sensitive material.

Thus, U.S. Pat. No. 3,781,748 describes, by way of sensitive element, a chalcogenide glass $Tl_2SeAs_2Te_3$ of about thirty microns in thickness, which takes advantage of the sensitivity of the resistivity of this material to temperature. However, this material is implemented by a hot-pressing technique at a temperature close to the glass transition temperature of this material (in the region of 100° C.) which is incompatible with the integration techniques of matrices of microbolometers as they expose the material to high temperatures. Furthermore, such a technique is also incompatible with the need to control the thickness of the films which must be about a few tens of nanometers in thickness.

U.S. Pat. No. 3,767,928 also describes producing a matrix of detectors the sensitive elements of which are chalcogenides. However, the mode of production of this matrix of detectors is not compatible with that implemented in microelectromechanical systems. In particular, the sensitive element is not thermally insulated from the substrate as it is with a suspended membrane, meaning that the detector described in this document has a low sensitivity, incompatible with the performance of matrices of bolometric detectors currently available on the market.

More recently, document US 2012/0132804 has for its part described producing a matrix of microbolometers based on chalcogenides using the technologies of microelectromechanical systems. The materials that are described in document US 2012/0132804 have a TCR coefficient located in a very high range of values, of about 4%/K, much higher than that of the materials conventionally used, such as Vox (vanadium oxide mixtures) and amorphous silicon, the TCRs of which are about 1.5 to 2%/K. This high TCR value of chalcogenide materials makes them effectively of interest for bolometry applications. However, these materials are sensitive to exposure to oxidizing atmospheres. Thus, during the integration of the matrices of bolometric pixels, and especially during the step of freeing the bolometric plate by calcination of the sacrificial layer, these materials oxidize and then become unusable for a bolometric application. The solution employed to prevent this oxidation generally consists in isolating these materials from exterior atmospheres by covering them with an encapsulation film. However, the implementation of such a film requires the material to be exposed to high temperatures, of about 300° C.

However, as illustrated in example 1, exposing these materials to such temperatures significantly degrades their TCR coefficient thereby making them unsuitable for a bolometry application.

The same problem is encountered when packaging microbolometers under vacuum into the hermetic packages required for their operation, as this requires the packaged microbolometer, comprising the sensitive material, to be baked at high temperatures, typically higher than 250° C., in an autoclave.

There therefore remains a need to provide a sensitive material that allows the deficiencies discussed above to be at least partially overcome.

The present invention more precisely aims to meet this need.

Thus, according to one of its aspects, the invention relates to the use, as a thin sensitive-material film for bolometric detection, of at least one material based on an alloy comprising at least one chalcogenide, characterized in that said material furthermore contains an effective amount of carbon and/or boron, and in that it possesses a temperature coefficient of resistivity (TCR) value at 300° C. at least equal to 40% of the native value of the temperature coefficient of resistivity of said material at room temperature.

In the context of the present invention, the expression "effective amount" is understood to mean the amount of carbon and/or boron advantageously required to confer upon said material a TCR value at 300° C. at least equal to 40% of the native value of the TCR of said material of room temperature. This amount of carbon and/or boron is to be considered with regard to the associated alloy and may therefore vary from one alloy to another. Based on their general knowledge, those skilled in the art will be able to adjust the amount of carbon and/or boron required to confer upon said material the desired TCR value.

Thus, the invention relates more specifically to the use, as a thin sensitive-material film for bolometric detection, of at least one material based on an alloy comprising at least one chalcogenide, said chalcogen element being chosen from sulfur, selenium, telluride and their mixtures, characterized in that said material furthermore contains a sufficient amount of carbon and/or boron to confer upon the material a temperature coefficient of resistivity value at 300° C. at least equal to 40% of the native value of the temperature coefficient of resistivity of said material at room temperature.

In the rest of the text, the expression "base alloy" will be used to designate the alloy comprising at least one chalcogenide. In the context of the invention, "base alloy" is understood to mean a mixture of pure chemical elements containing at least one metal or metalloid and at least one chalcogen.

A "chalcogenide" is a chemical compound containing at least one chalcogen element. Said chalcogen element is chosen from sulfur, selenium, telluride and their mixtures. For example, cadmium telluride is a chalcogenide.

In particular, the base alloy according to the invention has a high TCR value, typically higher than 2 in absolute value, and already constitutes a bolometric material.

The material according to the invention, made up of the base alloy and the sufficient amount of carbon and/or boron, forms what is called a "modified" alloy. In the modified alloy, and on the scale of a few interatomic distances, for example 3 to 5 interatomic distances, the order is defined by the atoms that form the base alloy. Similar to amorphous compounds, a "local order" may be spoken of that is characterized by X-ray absorption spectroscopy.

The carbon and/or boron of the modified alloy according to the invention may be referred to as "additional elements". A component of the modified alloy is called "additional element" if it may be removed without the material losing its bolometric quality (TCR coefficient higher than 2).

The inventors have discovered that, unexpectedly, the association, in the form of thin films, of an alloy comprising at least one chalcogenide, with an effective amount of carbon and/or boron, proves to be particularly effective as sensitive materials for bolometric devices for detecting the infrared. Integration of these materials into a bolometric system furthermore poses no problem.

Specifically, the inventors have observed that, surprisingly, the TCR coefficient of materials such as defined above does not decrease significantly when they are exposed to high temperatures. They may thus be exposed, if necessary, to the temperature required to deposit an encapsulation, which provides indispensable protection from the oxidizing conditions used to free the bolometric plate, while preserving a high TCR coefficient.

The present invention furthermore relates, according to another of its aspects, to a bolometric device for detecting infrared radiation or for infrared imaging, comprising at least one sensor equipped with a sensitive element based on a material such as defined above.

Advantageously, the sensor is inserted into a package containing an entrance window that is transparent in the infrared, and furthermore comprises a membrane capable of absorbing infrared radiation and converting it into heat, said membrane being placed so as to be able to be exposed to incident infrared radiation having passed through the entrance window, and to transmit some of the heat thus produced to said sensitive element.

According to yet another of its aspects, the present invention relates to a process for fabricating a bolometric device comprising at least the following steps:

i) providing a sensor equipped with a membrane capable of absorbing infrared radiation, said membrane being deposited on a carrier consisting of a sacrificial layer; and ii) forming in contact with said membrane a thin film of a sensitive element from a material such as defined above.

According to one preferred variant, step ii) is followed by a step iii) in which said thin film is encapsulated by what is called an encapsulation film, especially based on SiN.

In particular, step iii) is followed by a step iv) in which the sacrificial film is calcinated under oxidizing conditions and preferably under ozone plasma.

According to another preferred variant, the bolometric device is subjected, after step iv), to at least one annealing step at a temperature comprised between 300° C. and 400° C. and preferably comprised between 320° C. and 400° C.

Such an additional annealing step advantageously allows the resistivity of the material to be optimized for a bolometry application while preserving a high TCR coefficient.

Sensitive Material

The inventors have therefore observed that, unexpectedly, the association of a material based on an alloy comprising at least one chalcogenide and an effective amount of carbon and/or boron allows a sensitive material to be obtained for bolometric devices for detecting the infrared, this material advantageously having a moderate electrical resistivity, a low low-sequence noise and a high temperature sensitivity.

The sensitivity of a material is expressed, for bolometric detectors, by its temperature coefficient α, which is the temperature derivative of the resistance of the material divided by the resistance of the material:

$$\alpha = \frac{dR}{dT} \times \frac{1}{R} \times 100$$

The coefficient α is expressed in %·Kelvin$^{-1}$ (%·K$^{-1}$).

As specified above, the TCR coefficient of materials according to the invention does not decrease significantly when they are exposed to high temperatures. They may thus be exposed to the temperatures required to process the bolometric system.

Thus, according to invention, the sensitive material used in a bolometric device possesses a temperature coefficient of resistivity valve at 300° C. at least equal to 40% of the native value of the temperature coefficient of resistivity of said material at room temperature.

According to one preferred embodiment, the value of the temperature coefficient of resistivity at 300° C. of the sensitive material used according to the present invention is at least equal to 60%, preferably at least equal to 75% and in particular at least equal to 90% of the native value of the temperature coefficient of resistivity of said material at room temperature.

Preferably, the chalcogenide present in the base alloy is chosen from sulfur, selenium, telluride and their mixtures. In particular, it is a question of telluride.

According to one particular embodiment, the base alloy furthermore comprises at least one element chosen from antimony, germanium, tin, bismuth and their mixtures.

Preferably, the base alloy comprises at least germanium.

More preferably, the base alloy comprises from 40 at % to 70 at % telluride, from 5 at % to 60 at % germanium, from 0 at % to 50 at % of an element X chosen from antimony, tin or bismuth and from 0 at % to 50 at % of an element Y, different from the element X, chosen from antimony, tin or bismuth.

According to a first preferred variant, the base alloy comprises from 40 at % to 60 at % telluride and 40 at % to 60 at % germanium.

According to a second preferred variant, the base alloy comprises from 48 at % to 64 at % telluride, from 18 at % to 26 at % germanium and from 18 at % to 26 at % antimony.

According to another preferred embodiment, the base alloy comprises at least one chalcogenide respecting the formula:

$$Te_{(i)}Ge_{(j)}X_{(k)}Y_{(l)}$$

in which,
- X and Y represent, independently of each other, an element chosen from antimony, tin or bismuth;
- (i) varies from 0.4 to 0.7;
- (j) varies from 0.05 to 0.6;
- (k) varies from 0 to 0.5;
- (l) varies from 0 to 0.5;

with the sum of (i)+(j)+(k)+(l) being equal to 1.

Preferably, the value of (i) is higher than the value of (j).

Preferably, the value of k is different from 0.

According to one preferred embodiment, the sensitive material contains at least an effective amount of carbon. Those skilled in the art will be able to determine the amount required to confer upon said material the desired TCR value.

In particular, the material contains between 5 at % and 60 at %, preferably between 15 at % and 45 at % and better still between 17 at % and 30 at % carbon relative to the atomic composition of said material.

Thus, according to one preferred embodiment, the sensitive material according to the invention used in a bolometric device respects the formula:

$$Te_{(i)}Ge_{(j)}X_{(k)}Y_{(l)}C_{(m)}$$

in which,
- X and Y represent, independently of each other, an element chosen from antimony, tin or bismuth;
- (i) varies from 0.3 to 0.7;
- (j) varies from 0.03 to 0.6;
- (k) varies from 0 to 0.5;
- (l) varies from 0 to 0.5;
- (m) varies from 0.05 to 0.6;

with the sum of (i)+(j)+(k)+(l)+(m) being equal to 1.

The atomic composition of the sensitive material may be characterized by RBS (Rutherford backscattering spectrometry) and PIXE (particle induced X-ray emission) for the heavy elements (Te, Ge, Sb, Bi, Sn) and by NRA (nuclear reaction analysis) for the light elements (C and B).

Bolometric Device

As specified above, another aspect of the invention relates to a bolometric device for detecting infrared radiation or for infrared imaging, comprising at least one sensor equipped with a sensitive element based on a material such as defined above.

Advantageously, the sensitive element is implemented in the form of a thin film. Preferably, such a thin film has a thickness ranging from 10 to 500 nm.

According to one particular embodiment of the bolometric device of the invention, the sensor, which is inserted into a package containing an entrance window that is transparent in the infrared, furthermore comprises a membrane capable of absorbing infrared radiation and converting it into heat, said membrane being placed so as to be able to be exposed to incident infrared radiation having passed through the entrance window, and to transmit some of the heat thus produced to said sensitive element.

The invention also relates to the process for fabricating such a bolometric device comprising at least the following steps:
- i) providing a sensor equipped with a membrane capable of absorbing infrared radiation, said membrane being deposited on a carrier consisting of a sacrificial layer; and
- ii) forming in contact with said membrane a thin film of a sensitive element from a material such as defined above.

In order to form the thin film of the sensitive element, the material according to the invention may for example be deposited on the membrane using a co-sputtering technique.

Thus, according to one particular embodiment, the chalcogenide-based alloy and the carbon or boron are deposited using a co-sputtering technique from two targets, one made of pure boron or carbon and the other of the chalcogenide-based alloy. More precisely, the sputtering equipment is made up of three targets of 76 mm diameter arranged in a "bouquet", enabling the co-sputtering. The inclination of the targets is 60° to the horizontal and the target-substrate distance is 37 mm.

The residual pressure in the chamber is $2\times10^{-7}$ mbar and the working pressure (during the co-sputtering) is $4\times10^{-3}$ mbar. Argon is used as carrier gas. The carbon or boron composition of the modified alloy is obtained by applying suitable currents to each of the two targets. For example, the composition $Ge_{19\pm1}Sb_{19\pm1}Te_{40\pm2.5}C_{22\pm1\,at\,\%}$ is obtained by applying a current of 200 mA and of 80 mA to targets of C and $Ge_2Sb_2Te_5$, respectively. The deposition rate of this modified alloy is 2.1 Å/s.

According to other embodiments, the sensitive material, dedicated to forming the thin film, may also be deposited by IBS (ion beam sputtering) techniques or by ALD (atomic layer deposition) techniques.

As regards the membrane on which the thin film based on the material according to the invention is formed, it may consist for example of one or more dielectric films, especially of SiO and/or SiN.

In the case of a single film, the latter may be partially covered by electrodes, especially of TiN, possessing a high infrared absorbance. In the case of two films, the electrodes may either be placed on the surface of the external film or enclosed between the two films.

According to one particularly advantageous embodiment, step ii) is followed by a step iii) in which said thin film is encapsulated by what is called an encapsulation film, especially based on SiN.

Preferably, this step iii) is followed by a step iv) in which the sacrificial film is calcinated under oxidizing conditions and preferably under ozone plasma.

As mentioned above, the bolometric device is advantageously subjected, after step iv), to at least one annealing step at a temperature comprised between 300° C. and 400° C. and preferably comprised between 320° C. and 400° C.

In particular, the annealing step may be carried out under vacuum or under an inert atmosphere. The temperature of the annealing step may be reached in stages and especially with a ramp of 10° C./min, and optionally comprise an isothermal anneal.

FIG. 1 shows a simplified view of a bolometric device according to the invention.

The bolometric device that is shown therein comprises a thin membrane 10 capable of absorbing infrared radiation, and suspended above a carrier 13 by way of anchoring points 11. A sensitive film 14 is deposited on the membrane 10. This film 14 is encapsulated by an encapsulation film (not shown in FIG. 1) that protects it during technological operations subsequent to the deposition of the film 14. Under the effect of infrared radiation, the membrane 10 heats up and transmits its temperature to the film 14. The electrical interconnection between the sensitive film 14 and the read elements (not shown) placed on the substrate is achieved by a film (not shown), generally a metal film, passing through the anchoring points 11. The sensitivity of the thermal detection is especially improved by inserting insulating arms 12 between the carrier substrate and the membrane in order to limit the thermal losses of the latter. The variations in resistivity of the sensitive film are recorded using an appropriate read circuit.

In the bolometric devices according to the invention, the carrier substrate may be formed by an electronic circuit integrated into a silicon wafer on the one hand comprising stimuli devices and devices for reading temperature variations, and on the other hand multiplexing components that allow the signals issued from the various thermometers to be serialized and transmitted to a small number of outputs in order to be exploited by a conventional imaging system.

Figure 2A:
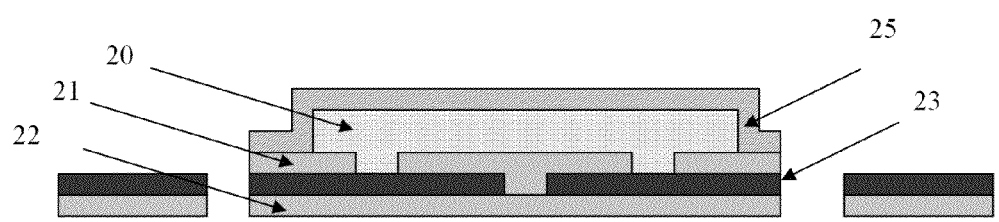
Figure 2B:
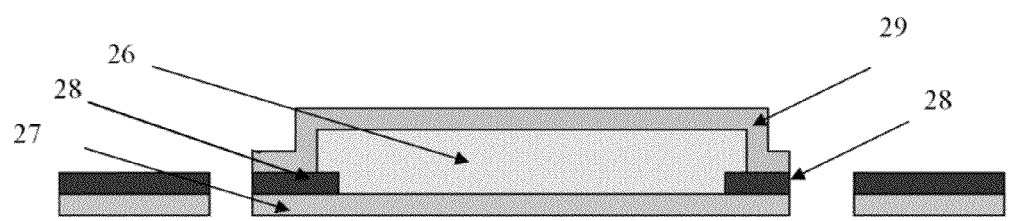

FIGS. 2A-2B show a cross section through FIG. 1 along AA' and illustrates two variants of integration of a thin film of material according to the invention into a coplanar-electrode detector.

In FIG. 2A, the structure carrying a thin film 20 of material according to the invention consists of two insulating films 21 and 22 enclosing the metal electrodes 23. The insulating film 22 deposited on the metal film comprises contact apertures so as to connect the sensitive element. The film 25 is the encapsulation film, for example made of SiN, possibly required to protect the material during the technological step of freeing the sacrificial film (especially a film made of polyimide) carried out in an ozone plasma.

In FIG. 2B, the structure carrying a thin film 26 of material according to the invention consists of a single insulating film 27 on which rest the metal electrodes 28 making direct contact with the sensitive element 26. In this configuration, it may be advantageous to deposit an infrared-absorbing film on one of the faces of the structure.

As in FIG. 2A, the material according to the invention 26 is covered by an encapsulation film 29, for example made of SiN.

In these two variant embodiments, etching a thin film of material according to the invention allows the material to be removed in the region of the insulating arms and in the regions separating the detectors from one another.

These two embodiments advantageously lead to a component that is optimized in terms of signal-to-noise ratio.

It will be understood that bolometric devices according to the invention may comprise a plurality of sensors in the form of a matrix array of pixels. Such an array of sensors may for example be connected to a CCD or CMOS read circuit. With an appropriate imaging system, the device of the invention then constitutes an infrared video camera.

The bolometric devices of the invention may also be integrated into what are called monolithic structures fabricated on the wafer scale using microelectronic processes that were developed for silicon.

Thus, monolithic infrared imagers, operating at room temperature, may be fabricated by directly connecting a matrix of sensitive elements to a CMOS or CCD multiplexing circuit. The carrier substrate may consist of an integrated electronic circuit on the one hand comprising stimuli devices and read devices, and on the other hand multiplexing components that allow the signals issued from the various detectors to be serialized and transmitted to a small number of outputs in order to be exploited by a conventional imaging system In such devices, the insulating carriers are produced in the form of thin films having for example a thickness from 5 to 100 nm. These insulating elements (for example SiN, SiO, ZnS, etc.) are obtained using the low-temperature deposition techniques conventionally used with these materials, such as cathode sputtering or plasma-enhanced chemical vapor deposition (PECVD). These materials are generally etched by reactive ion etching processes.

The metals (for example Ti, TiN, Pt, etc.) from which the electrodes are formed are preferably deposited by cathode sputtering. The shape of the electrodes is defined by chemical or plasma etching processes. The thickness of the electrodes is for example comprised between 5 nm and 100 nm. The electrodes, which extend into the insulating arms, are connected to the input stage of the read circuit by conventional connection processes and are tailored to the structure of the micro-bridge (corresponding to the anchoring points 11 in FIG. 1).

The material is deposited in the form of a thin film according to the invention using the aforementioned co-sputtering technique or IBS sputtering techniques or ALD techniques. It is etched by chemical etching (HCl, $H_3PO_4$) or by specific plasma etching processes or even by ion milling.

The invention also relates to a method for detecting infrared radiation or producing infrared images, using a bolometric device capable of absorbing incident radiation and converting it into heat, and of communicating some of the heat produced to a sensitive element the resistivity of which varies with temperature, in which said device is such as defined above.

The device of the invention is usable in many fields of application, for example in the military field (night-time targeting and reconnaissance), in the industrial field (quality control of parts), in the security field (fire detection, location of victims in smoky rooms, night-time surveillance of sites, night-time driving aids), or in the medical field (mapping of blood flow, mammography, etc.).

The following examples and figures are given by way of non-limiting illustration of the field of the invention.

FIGURES

FIG. 1 schematically shows a simplified perspective view of one embodiment of a bolometric device according to the invention.

FIGS. 2A-2B show a cross section through FIG. 1 along AA' and depicts two variants of integration of a thin film of material according to the invention into a coplanar-electrode detector.

EXAMPLE

Synthesis of Materials According to the Invention and Characterization of their Temperature Coefficient of Resistivity (TCR) and their Anneal Temperature Resistivity Change a) Material Synthesis Thermometer materials based on a GeTe or $Ge_2Sb_2Te_5$ alloy or a GeSbTe alloy with various percentages of carbon were produced.

The alloy was deposited by a co-sputtering technique from two targets, one comprising pure carbon and the other the chalcogenide-based alloy. The sputtering equipment comprised three targets arranged in a "bouquet", enabling the co-sputtering. The inclination of the targets was 60° C. to the horizontal and the target-substrate distance was 37 mm.

The residual pressure in the chamber was $2 \times 10^{-7}$ mbar and the working pressure (during the co-sputtering) was $4 \times 10^{-3}$ mbar. Argon was used as carrier gas. The variation in carbon composition of the alloy was obtained by modifying the currents applied to each of the two targets. For example, the composition $Ge_{19\pm1}Sb_{19\pm1}Te_{40\pm2.5}C_{2\pm1\,at}$ % was obtained by applying a current of 200 mA and of 80 mA to targets of C and $Ge_2Sb_2Te_5$, respectively. The deposition rate of this alloy was 2.1 Å/s.

The materials were deposited on a 750 nm film of $SiO_2$ in order to form a 100 nm film.

b) TCR Coefficient Measurements

Temperature coefficient of resistivity (TCR) measurements were carried out on the various materials.

In particular, the TCR of each material was measured by a conventional technique for measuring the electrical resistivity of films deposited on-insulator (the "4 point" method). The measuring device furthermore comprised a hotplate allowing the temperature of the film to be adjusted to within $\pm 0.1°$ C. and its resistivity $\rho_{28}$ and $\rho_{32}$ to be measured at 28° C. ($T_{28}$) and 32° C. ($T_{32}$), respectively.

The TCR of the material at room temperature was obtained via the relationship:

$$TCR = 1/((\rho_{32}+\rho_{28})/2) \cdot ((\rho_{32}-\rho_{28})/(T_{32}-T_{28}))$$

Its value after deposition by sputtering (as-deposited material) was compared to that measured for the same sample once its temperature had returned to room temperature (30° C.) after being exposed to a temperature of 300° C. for five seconds in an oven under an argon atmosphere or under vacuum.

The results are given in Table 1 below.

TABLE 1

| Material | TCR measured on material before exposure (% · K$^{-1}$) (+/−0.3% · K$^{-1}$) | TCR measured on material after exposure to 300° C. for 5 seconds (% · K$^{-1}$) (+/−0.3% · K$^{-1}$) |
|---|---|---|
| GeTe (Comparative) | −4.7 | −0.2 |
| Alloy GeTe + C: $Ge_{48\pm3}Te_{42\pm3}C_{10\pm1.5\,at\,\%}$ | −5.1 | −4.9 |
| $Ge_2Sb_2Te_5$ (Comparative) | −4.7 | −0.6 |
| Alloy $Ge_2Sb_2Te_5$ + C: $Ge_{19\pm1}Sb_{19\pm1}Te_{40\pm2.5}C_{17\pm1\,at\,\%}$ (Comparative) | −4.6 | −0.34 |
| Alloy $Ge_2Sb_2Te_5$ + C: $Ge_{19\pm1}Sb_{19\pm1}Te_{40\pm2.5}C_{22\pm1\,at\,\%}$ | −5.6 | −5.4 |
| Alloy $Ge_2Sb_2Te_5$ + C: $Ge_{15\pm1}Sb_{15\pm1}Te_{30\pm2.5}C_{40\pm1\,at\,\%}$ | −5.3 | −4.2 |

When the chalcogenide-based alloy is associated with carbon in a sufficient amount (such as for example about 22% for the chalcogenide $Ge_2Sb_2Te_5$), the material in preserved a high TCR value after exposure to a temperature of 300° C. Therefore, it is suitable for a bolometric application.

In contrast, exposure of the chalcogenide-based alloys alone to 300° C. or with a non-effective amount of carbon resulted in a significantly decreased TCR value. Such a decrease in TCR value makes the material unusable in bolometry applications.

c) Determination of the Anneal Temperature Resistivity Change

The resistivity and TCR of the thermometer materials were measured at a temperature of 30° C. after an anneal at various temperatures for 5 seconds in an oven under a neutral argon atmosphere or under vacuum.

The TCR of each material was measured such as indicated in point b) above.

The resistivity at room temperature is given by:

$$\rho=(\rho_{32}+\rho_{28})/2$$

All of the results are collated in Table 2.

TABLE 2

| Material | | Alloy 1<br>GeSbTe + 22% C:<br>$Ge_{19\pm1}Sb_{19\pm1}Te_{40\pm2.5}C_{22\pm1\,at\,\%}$ | Alloy 2<br>GeSbTe + 40% C:<br>$Ge_{15\pm1}Sb_{15\pm1}Te_{30\pm2.5}C_{40\pm1\,at\,\%}$ |
|---|---|---|---|
| Material before exposure | TCR (% · K$^{-1}$)<br>(+/−0.3% · K$^{-1}$) | −5.6 | −5.3 |
| | p (ohm · cm) | $1.8^E 4$ | $1.9^E 4$ |
| Material after exposure to 300° C. for 5 seconds | TCR (% · K$^{-1}$)<br>(+/−0.3% · K$^{-1}$) | −5.4 | −4.2 |
| | p (ohm · cm) | $1.6^E 4$ | $1.8^E 4$ |
| Material in the bolometric device after exposure to 325° C. for 5 seconds | TCR (% · K$^{-1}$)<br>(+/−0.3% · K$^{-1}$) | −3.35 | −2.7 |
| | p (ohm · cm) | 194 | 275 |
| Material in the bolometric device after exposure to 330° C. for 5 seconds | TCR (% · K$^{-1}$)<br>(+/−0.3% · K$^{-1}$) | −3.0 | −2.5 |
| | p (ohm · cm) | 58 | 133 |
| Material in the bolometric device after exposure to 340° C. for 5 seconds | TCR (% · K$^{-1}$)<br>(+/−0.3% · K$^{-1}$) | −2.4 | −2.28 |
| | p (ohm · cm) | 31 | 35 |

The application of an annealing step to the bolometric device comprising a thermometer material based on the GeSbTe alloy associated with carbon allowed both a high TCR value and a resistivity allowing optimal operation of the read system to be preserved.

In the case of $Ge_{19\pm1}Sb_{19\pm1}Te_{40\pm2.5}C_{22\pm1\,at\,\%}$, an anneal at 330° C. allowed a resistivity lower than 100 ohm·cm to be obtained.

In the case of $Ge_{15\pm1}Sb_{15\pm1}Te_{30\pm2.5}C_{40\pm1\,at\,\%}$, an anneal at 340° C. allowed a resistivity lower than 100 ohm·cm to be obtained.

d) Production of Microbolometers

The anneal temperature resistivity change having been determined in c), this anneal was carried out before the microbolometer was packaged, after step iv) of calcinating the sacrificial film described above.

The invention claimed is:

1. A method of bolometric detection of infrared radiation comprising:
   obtaining a thin sensitive-material film comprising an alloy comprising at least one chalcogenide, said chalcogen element being chosen from sulfur, selenium, and/or telluride and a sufficient amount of carbon and/or boron to confer upon the material a temperature coefficient of resistivity value at 300° C. at least equal to 40% of the native value of the temperature coefficient of resistivity of said material at room temperature; and
   using the thin sensitive-material film for bolometric detection of infrared radiation.

2. The method according to claim 1, wherein the value of the temperature coefficient of resistivity at 300° C. is at least equal to 60% of the native value of the temperature coefficient of resistivity of said material at room temperature.

3. The method according to claim 1, wherein the alloy comprises at least telluride.

4. The method according to claim 1, wherein said material contains at least a sufficient amount of carbon to confer upon the material a temperature coefficient of resistivity value at 300° C. at least equal to 40% of the native value of the temperature coefficient of resistivity of said material at room temperature.

5. The method according to claim 1, wherein said material contains between 5 atomic % and 60 atomic % carbon relative to the atomic composition of said material.

6. The method according to claim 1, wherein the alloy further comprises at least one element chosen from antimony, germanium, tin, and/or bismuth.

7. The method according to claim 1, wherein the alloy further comprises at least germanium.

8. The method according to claim 1, wherein the alloy comprises from 40 atomic % to 70 atomic % telluride, from 5 atomic % to 60 atomic % germanium, from 0 atomic % to 50 atomic % of an element X chosen from antimony, tin or bismuth and from 0% to 50% of an element Y, different from the element X, chosen from antimony, tin or bismuth.

9. The method according to claim 1, wherein the alloy comprises from 40 atomic % to 60 atomic % telluride and 40 atomic % to 60 atomic % germanium.

10. The method according to claim 1, wherein the alloy comprises from 48 atomic % to 64 atomic % telluride, from 18 atomic % to 26 atomic % germanium and from 18 atomic % to 26 atomic % antimony.

11. A bolometric device for detecting infrared radiation or for infrared imaging, comprising at least one sensor equipped with a sensitive element based on a thin sensitive-material film comprising an alloy comprising at least one chalcogenide, said chalcogen element being chosen from sulfur, selenium, and/or telluride and a sufficient amount of carbon and/or boron to confer upon the material a temperature coefficient of resistivity value at 300° C. at least equal to 40% of the native value of the temperature coefficient of resistivity of said material at room temperature.

12. The bolometric device according to claim 11, wherein the sensitive element is implemented in the form of a thin film.

13. The bolometric device according to claim 12, wherein the thin film has a thickness ranging from 10 nm to 500 nm.

14. The bolometric device according to claim 11, wherein the sensor is inserted into a package containing an entrance window that is transparent in the infrared, and further comprises a membrane capable of absorbing infrared radiation and converting it into heat, said membrane being placed so as to be able to be exposed to incident infrared radiation having passed through the entrance window, and to transmit some of the heat thus produced to said sensitive element.

15. The bolometric device according to claim 11, comprising a plurality of said sensors in the form of a matrix array of pixels.

16. The bolometric device according to claim 15, wherein said array is connected to a CCD or CMOS read circuit.

17. A process for fabricating a bolometric device comprising at least the following steps:
   i) providing a sensor equipped with a membrane capable of absorbing infrared radiation, said membrane being deposited on a carrier consisting of a sacrificial layer; and
   ii) forming in contact with said membrane a thin film of a sensitive element from a thin sensitive-material film comprising an alloy comprising at least one chalcogenide, said chalcogen element being chosen from sulfur, selenium, and/or telluride and a sufficient amount of carbon and/or boron to confer upon the material a temperature coefficient of resistivity value at 300° C. at least equal to 40% of the native value of the temperature coefficient of resistivity of said material at room temperature.

18. The process according to claim 17, wherein the said membrane consists of one or more dielectric films.

19. The process according to claim 18, wherein the one or more dielectric films comprises SiO and/or SiN.

20. The process according to claim 17, wherein step ii) is followed by a step iii) in which said thin film is encapsulated by what is called an encapsulation film.

21. The process according to claim 20, wherein the step iii) is followed by a step iv) in which the sacrificial film is calcinated under oxidizing conditions.

22. The process according to claim 21, wherein the oxidizing conditions is ozone plasma.

23. The process according to claim 20, wherein the encapsulation film comprises SiN.

24. The process according to claim 17, wherein the bolometric device is subjected, after step iv), to at least one annealing step at a temperature comprised between 300° C. and 400° C.

25. The process according to claim 24, wherein the temperature of the annealing step is reached in stages.

26. The process according to claim 24, wherein the annealing step comprises an isothermal anneal.

27. The process according to claim 24, wherein the annealing step is carried out under vacuum or under an inert atmosphere.

* * * * *